United States Patent [19]
Gonzalez

[11] Patent Number: 5,316,558
[45] Date of Patent: May 31, 1994

[54] CATALYTIC CLEAN-COMBUSTION-PROMOTER COMPOSITIONS FOR LIQUID HYDROCARBON FUELS USED IN INTERNAL COMBUSTION ENGINES

[76] Inventor: Frank Gonzalez, 601 Jeferson, Suite 320, Houston, Tex. 77002

[21] Appl. No.: 932,063

[22] Filed: Aug. 19, 1992

Related U.S. Application Data

[63] Continuation-in-part of Ser. No. 608,526, Nov. 2, 1990, Pat. No. 5,141,524.

[51] Int. Cl.$^5$ .............................................. C10L 1/22
[52] U.S. Cl. .................................... 44/340; 44/414; 44/426; 44/438; 44/439; 44/446; 44/451
[58] Field of Search ............... 44/340, 414, 426, 439, 44/451, 449, 446, 438

[56] References Cited

U.S. PATENT DOCUMENTS

| | | | |
|---|---|---|---|
| 3,002,827 | 10/1961 | Fenske | 44/451 |
| 3,163,504 | 12/1964 | Calvino | 44/340 |
| 4,131,434 | 12/1978 | Gonzalez | 44/413 |
| 4,682,984 | 7/1987 | Epher | 44/448 |
| 5,116,390 | 5/1992 | Rodriquez et al. | 44/302 |
| 5,141,524 | 8/1992 | Gonzalez | 44/340 |

*Primary Examiner*—Margaret Medley
*Attorney, Agent, or Firm*—Kenneth A. Roddy

[57] ABSTRACT

Petroleum derived fuel compositions of improved efficiency for use with finished gasoline and diesel fuels in compression ignition engines and spark ignition engines include a catalytic clean-combustion-promoter composition to improve fuel efficiency and reduce their air polluting effects. The catalytic clean-combustion-promoter compositions utilize ketones as solvents, alcohols as cosolvents, ethers as octane supporters, nitroparaffin compounds as combustion supporters, and, to promote the chemical reactions a catalytic medium is used in combination with aromatic amines. When all the compounds are combined in the recited quantities, the molecular structure and surface tension of the fuel is transformed through chemical bonding to produce a synergistic effect, which increases the combustion characteristic of the fuels to be burned and reduces the tendency of the fuel to create deposits, and therefore reduces the exhaust emissions. Engines operating with the catalytic clean-combustion-promoter compositions added to the fuel do not require the use of fuels with a high cetane or octane number for maximum performance. Such compositions may be employed in micro-amount ranging from 400 to 2,500 parts per million relative to the volume of the basic liquid of engine fuel. The present catalytic clean-combustion-promoter compounds meet the standards of the EPA "Clean Air Act" as amended in 1990.

2 Claims, No Drawings

CATALYTIC CLEAN-COMBUSTION-PROMOTER COMPOSITIONS FOR LIQUID HYDROCARBON FUELS USED IN INTERNAL COMBUSTION ENGINES

CROSS REFERENCE TO RELATED APPLICATIONS

This application is a Continuation-In Part of U.S. patent application Ser. No. 07/608,526, now U.S. Pat. No. 5,141,524 issued Aug. 25, 1992.

BACKGROUND OF THE INVENTION

1. Field of the Invention

This invention relates generally to additives for gasoline and diesel fuels, and more particularly to a catalytic clean-combustion-promoter composition to improve fuel efficiency and reduce air polluting effects of liquid hydrocarbon fuels.

2. Brief Description of the Prior Art

The Environmental Protection Agency (EPA) "Clean Air Act" sets the standards for fuel emissions. The Clean Air Act was amended in the Fall of 1990 to limit pollution from 189 toxic substances. Focusing on toxicity and exposure potential, the EPA has designated the following chemicals as toxic enemies No. 1 through 17: benzene; cadmium and its compounds; cyanides; dichloromethane; lead and its compounds; mercury and its compounds; methyl ethyl ketone; nickel and its compounds; tetrachloroethylene; toluene; 1,1,1-trichloroethane; trichloroethane; and xylene(s).

Gasoline and diesel fuel additives are known which when added to the basic fuel will improve fuel efficiency and reduce air polluting effects of the fuel. There are several patents on such additives. However, many of these compositions contain chemicals identified by the EPA as posing the greatest threats to human health and making them unsuitable or illegal to use.

Fenske, U.S. Pat. No. 3,002,827, discloses a fuel composition for diesel engines, where he uses an aliphatic nitro-compound selected from the class consisting of nitro-alkanes, alkyl nitrates, alkyl nitrites, and nitro alcohol nitrates as an ignition promoter and in the ratio of from about 0.5% to 1.5% in volume (5,000 to 15,000 parts per million). The present invention, on the other hand, utilizes nitro-paraffins selected from the group consisting of 1-nitropropane, 2-nitropropane, and nitro ethane as combustion supporters for gasoline and diesel fuels and in the ration of only from 4 to 1,125 parts per million by volume.

Calvino, U.S. Pat. No. 3,163,504, teaches the use of alkyl pyrrolidone as an inhibitor of aqueous haze formation in the ratio of from about 1.0% to 2.0% in volume (10,000 to 20,000 parts per million). The present invention, on the other hand, utilizes n-methyl-2-pyrrolidone which is blended with aromatic amines and serves as a catalytic medium which increases the chemical reaction rate of the catalytic clean-combustion-promoter compositions when they are added in liquid hydrocarbon fuels. The n-methyl-2-pyrrolidone catalytic medium ratio is only from 4 to 500 parts per million.

Michaels, U.S. Pat. No. 2,900,297, discloses a fuel composition which uses nitroparaffin compounds blended with gasoline and a liquid ester lubricant. The present invention, on the other hand, utilizes nitroparaffin compounds only as combustion supporters for gasoline and diesel fuels.

Eckerd, U.S. Pat. No. 3,707,360, discloses the use of nitropropane combined with calcium compounds to reduce smoke emissions. The calcium sulfonate used by Eckerd creates deposits which cause plugging of the fuel injectors in a combustion engine, and results in reduced engine efficiency and increased emission of air pollutants. The present invention, on the other hand, utilizes nitroparaffin compounds as combustion supporters for gasoline and diesel fuels and in combination with other compounds which increase engine efficiency and reduce emission of air pollutants.

Simmons, U.S Pat. No. 4,073,626, discloses a diesel fuel additive which uses an iron salt of an aromatic nitro acid as ferrous picrate, and a nitro aliphatic compound as 1-nitropropane blended with an aromatic petroleum solvent as xylene, toluene, etc., to increase the fuel's combustion. The xylene and toluene compounds utilized by Simmons are now forbidden by the EPA "Clean Air Act" as amended in 1990. The present invention, on the other hand, utilizes nitroparaffin compounds as combustion supporters for gasoline and diesel fuels and contains none of the toxic chemicals referred to in the 1990 "Clean Air Act" amendment.

Gonzalez, U.S. Pat. No. 4.131,434, discloses a catalytic additive composition for combustion engine fuels which includes benzene, toluene, or xylene, and methyl ethyl ketone. These compounds are now forbidden by the EPA "Clean Air Act" as amended in 1990. The present invention, on the other hand, contains none of the toxic chemicals referred to in the 1990 "Clean Air Act" amendment.

The present invention is distinguished over the prior art in general, and these patents in particular by a catalytic clean-combustion-promoter composition for use with finished gasoline and diesel fuels in compression ignition engines and spark ignition engines to improve fuel efficiency and reduce air polluting emissions. The catalytic clean-combustion-promoter compositions utilize ketones as solvents, alcohols as cosolvents, ethers as octane supporters, nitroparaffin compounds as combustion supporters, and, to promote the chemical reactions a catalytic medium is used in combination with aromatic amines. When all the compounds are combined in the recited quantities, the molecular structure and surface tension of the fuel is transformed through chemical bonding to produce a synergistic effect, which increases the combustion characteristic of the fuels to be burned and reduces the tendency of the fuel to create deposits, and therefore reduces the exhaust emissions. Engines operating with the catalytic clean-combustion-promoter compositions added to the fuel do not require the use of fuels with a high cetane or octane number for maximum performance. Such compositions may be employed in micro-amounts ranging from 400 to 2,500 parts per million relative to the volume of the basic liquid engine fuel. The present catalytic clean-combustion-promoter compounds meet the standards of the EPA "Clean Air Act" as amended in 1990.

SUMMARY OF THE INVENTION

It is therefore an object of the present invention to provide a catalytic clean-combustion-promoter composition which, when added to liquid hydrocarbon fuels, will improve the combustion characteristics of the fuel during the combustion process.

It is another object of this invention to provide a catalytic clean-combustion-promoter composition which is effective when added in concentrations of parts per million (ppm) by volume of fuel.

Another object of this invention is to provide a catalytic clean-combustion-promoter composition which, when added to liquid hydrocarbon fuels in micro-amounts, will produce hydrophilic properties in the fuel and form an emulsified fuel to produce a cooling effect which reduces exhaust emissions of nitrogen oxides.

Another object of this invention is to provide a catalytic clean-combustion-promoter composition which, when added to liquid hydrocarbon fuels in micro-amounts, will change the surface tension of the fuel whereby the surface tension is reduced in diesel, heating, jet, and kerosene fuels, and the surface tension is increased in gasoline fuels.

Another object of this invention is to provide a catalytic clean-combustion-promoter composition which, when added to liquid hydrocarbon fuels in micro-amounts, will change the size of the fuel droplets during the atomization process in fuel injectors and allow more efficient burning of the hydrocarbons in the fuels to reduce exhaust emissions of carbon monoxide and unburned hydrocarbons.

Another object of this invention is to provide a catalytic clean-combustion-promoter composition which, when added to liquid hydrocarbon fuels in micro-amounts, will depolymerize existing gum formation and hold oxidation constituents in solution.

Another object of this invention is to provide a catalytic clean-combustion-promoter composition which, when added to gasoline fuels in micro-amounts, will reduce its vapor pressure (RVP) which decreases the abnormal volatility of the gasoline fuel.

A further object of this invention is to provide a catalytic clean-combustion-promoter composition which, when added to liquid hydrocarbon fuels in micro-amounts, will clean the whole fuel system of gums and varnishes, remove the particles of carbon built-up on injectors, valves, and on the combustion engine parts, thus promoting the normal combustion chamber temperatures and allowing a quicker cooling effect which also contributes to reduced exhaust emissions of nitrogen oxides.

A still further object of this invention is to provide a catalytic clean-combustion-promoter composition which, utilizes ketones and alcohols with slow evaporation rates, to reduce the volatile tendency of the fuel composition as required by the EPA's "Clean Air Act" amendment of 1990 and does not use toxic chemicals forbidden by the "Clean Air Act" such as; benzene, toluene, xylene(s), methyl ethyl ketone (MEK) and methyl isobutyl ketone (MIBK).

Other objects of the invention will become apparent from time to time throughout the specification and claims as hereinafter related.

The above noted objects and other objects of the invention are accomplished by a catalytic clean-combustion-promoter composition for use with finished gasoline and diesel fuels in compression ignition engines and spark ignition engines to improve fuel efficiency and reduce air polluting emissions. The catalytic clean-combustion-promoter compositions utilize ketones as solvents, alcohols as cosolvents, ethers as octane supporters, nitroparaffin compounds as combustion supporters, and, to promote the chemical reactions a catalytic medium is used in combination with aromatic amines. When all the compounds are combined in the recited quantities, the molecular structure and surface tension of the fuel is transformed through chemical bonding to produce a synergistic effect, which increases the combustion characteristic of the fuels to be burned and reduces the tendency of the fuel to create deposits, and therefore reduces the exhaust emissions. Engines operating with the catalytic clean-combustion-promoter compositions added to the fuel do not require the use of fuels with a high cetane or octane number for maximum performance. Such compositions may be employed in micro-amounts ranging from 400 to 2,500 parts per million relative to the volume of the basic liquid engine fuel. The catalytic clean-combustion-promoter compounds meet the standards of the EPA "Clean Air Act" amended in 1990.

DESCRIPTION OF THE PREFERRED EMBODIMENT

The present invention is a catalytic clean-combustion-promoter composition which is used with finished gasoline and diesel fuels in compression ignition engines and spark ignition engines to improve fuel efficiency and reduce air polluting emissions. Engines operating with the catalytic clean-combustion-promoter compositions added to the fuel do not require the use of fuels with a high cetane or octane number for maximum performance.

The catalytic clean-combustion-promoter compositions utilize ketones as solvents, alcohols as cosolvents, ethers as octane supporters in unleaded gasoline fuels, nitroparaffin compounds as combustion supporters in diesel fuels, and, to promote the chemical reactions a catalytic medium is used in combination with aromatic amines. The compounds of the catalytic clean-combustion-promoter compositions are provided in micro volumetric concentrations between 400 to 2,500 parts per million (ppm) relative to the volume of the basic liquid engine fuel, regardless whether the chemical components are in the lower or upper percentage range by volume ratio.

When all the compounds are combined in the quantities as described below, the molecular structure and surface tension of the fuel is transformed through chemical bonding to produce a synergistic effect, which increases the combustion characteristic of the fuels to be burned and reduces the tendency of the fuel to create deposits, and therefore reduces the exhaust emissions.

It should pointed out that the present catalytic clean-combustion-promoter composition meets the standards of the EPA "Clean Air Act" as amended in the Fall of 1990 by utilizing ketones and alcohols with slow evaporation rates to reduce the volatile tendency of the fuel composition as required by the Act and does not use toxic chemicals forbidden by the Act, such as; benzene, toluene, xylene(s), methyl ethyl ketone (MEK) and methyl isobutyl ketone (MIBK).

The present catalytic clean-combustion-promoter composition utilizes the chemical additives in ratio by volume as follows:

1) From 1 to 30 per cent by volume of an aromatic amine selected from the group consisting of n-ethylaniline $C_8H_{11}N$, and n,n-diethylaniline $C_6H_5N(C_2H_5)_2$.

2) From 1 to 85 per cent by volume of ketone as a solvent selected from the group consisting of 2-heptanone $C_7H_{14}O$, and 5-methyl-3-heptanone $C_8H_{16}O$.

3) From 1 to 85 per cent by volume of an alcohol as a co-solvent selected from the group consisting of diacetone alcohols and methyl amyl alcohols 2-pentanone- 4-methyl-4-hydrox $C_6H_{12}O_2$, and 2-pentanol-4-methyl $C_6H_{14}O$ respectively.

4) From 1 to 45 per cent by volume of a catalytic medium to promote chemical reactions, 1-methyl, 2-pyrrolidone $C_5H_9NO$.

5) From 1 to 85 per cent by volume of a nitro-compound selected from the group consisting of 1-nitropropane $CH_3CH_2CH_2NO_2$, 2-nitropropane $CH_3CH(NO_2)CH_3$, and nitroethane $CH_3CH_2NO_2$ used as combustion supporters in gasoline or diesel fuels.

6) From 1 to 85 per cent by volume of an ether selected from the group consisting of methyl tert-butyl ether (MTBE), ethyl tert-butyl ether (ETBE), and tert-amyl-methyl-ether (TAME) used as an octane supporter in gasoline fuels.

In the following Table "A", the compounds are identified by specific mixtures for the respective unleaded gasoline and diesel fuels in ratios ranging from 400. to 2,500 parts per million (ppm) relative to the volume of the basic liquid engine fuel, regardless whether the chemical components are in the lower or upper percentage range by volume ratio.

ture changes the surface tension of the fuel whereby the surface tension is reduced in diesel, heating, jet, and kerosene fuels, and the surface tension is increased in gasoline fuels. The catalytic clean-combustion-promoter composition will cause the size of the fuel droplets to change during the atomization process in fuel injectors and allow more efficient burning of the hydrocarbons in the fuels to reduce exhaust emissions of nitrogen oxides ($NO_X$), carbon monoxide (CO), and unburned hydrocarbons (HC).

The present catalytic clean-combustion-promoter composition also depolymerizes existing gum formations and holds oxidation constituents in solution such that the whole fuel system will be cleaned of gums and varnishes and particles of carbon built-up on injectors, valves, and on the combustion engine parts will be removed, thus reducing the necessity of using engine fuels with a high cetane or octane number. The cleaning effects promote normal combustion chamber temperatures and allowing quicker cooling which also contributes to reduced exhaust emissions of nitrogen oxides ($NO_X$)

TABLE A

| COMPOUNDS | CATALYTIC PROMOTER "G" For unleaded gasoline. Mixture ratio from 400 ppm to 2,500 ppm by volume | CATALYTIC PROMOTER "D" For diesel fuel. Mixture ratio from 400 ppm to 2,500 ppm by volume |
|---|---|---|
| AROMATIC AMINE n-ethylaniline $C_8Hhd 11N$, and n,n-diethylaniline $C_6H_5N(C_2H_5)_2$. | From 1% to 30% | From 1% to 20% |
| ALIPHATIC KETONE SOLVENTS 2-heptanone $C_7H_{14}O$, and 5-methyl-3-heptanone $C_8H_{16}O$. | From 1% to 55% | From 1% to 85% |
| ALCOHOL AS COSOLVENT 2-pentanone-4-methyl-4-hydroxy $C_6H_{12}O_2$, and 2-pentanol-4-methyl $C_6H_{14}O$. | From 1% to 60% | From 1% to 85% |
| CATALYTIC MEDIUM 1-methyl, 2-pyrrolidone $C_5H_9NO$ | From 1% to 30% | From 1% to 45% |
| NITROPARAFFINS AS COMBUSTION SUPPORTERS 1-nitropropane $CH_3CH_2CH_2NO_2$, 2-nitropropane $CH_3CH(NO_2)CH_3$, and nitroethane $CH_3CH_2NO_2$ | From 1% to 35% | From 1% to 85% |
| ETHERS AS OCTANE SUPPORTERS MTBE, ETBE, and TAME | From 1% to 85% | |

The catalytic clean-combustion-promoter is subject to total combustion at the same temperature as the fuels and the particular formulation of the chemical compounds, when added to liquid hydrocarbon fuels produce a synergistic effect which promotes physical transformations in the rearrangement of their molecular structure through chemical bonding, and alters the surface tension of the mixture.

The catalytic clean-combustion-promoter composition produces hydrophilic properties in the liquid hydrocarbon fuels and form an emulsified fuel which produces a cooling effect which results in reduced exhaust emissions of nitrogen oxides ($NO_X$). The recited mix- When added to gasoline fuels, the catalytic clean-combustion-promoter composition reduces the vapor pressure (RVP) which decreases the abnormal volatility of the gasoline fuel.

The present catalytic clean-combustion-promoter composition meets the standards of the EPA "Clean Air Act" as amended in the Fall of 1990 by utilizing ketones and alcohols with slow evaporation rates to reduce the volatile tendency of the fuel composition as required by the Act and does not use toxic chemicals forbidden by the Act, such as; benzene, toluene, xylene(s), methyl ethyl ketone (MEK) and methyl isobutyl ketone (MIBK).

While this invention has been described fully and completely with special emphasis upon a preferred embodiment, it should be understood that within the scope of the appended claims the invention may be practiced otherwise than as specifically described herein.

I claim:

1. A liquid petroleum derived diesel fuel composition comprising a basic diesel fuel for compression ignition engines and a catalytic clean combustion promoter composition comprising by volume:

| | |
|---|---|
| an aromatic amine selected from the group consisting of n-ethyl aniline and diethylaniline | from 1 to 20% |
| a ketone solvent selected from the group consisting of ethyl isoamyl ketone and n-amyl ketone | from 1 to 85%, |
| a cosolvent selected from the group consisting of diacetone alcohol and methyl amyl alcohol | from 1 to 85%, |
| a catalytic medium comprising 1-methyl-2-pyrrolidone and | from 1 to 45%, |
| a nitroparaffin compound selected from the group consisting of 1-nitropropane, 2-nitropropane, and nitroethane | from 1 to 85% | said catalytic clean combustion promoter composition is present in micro volumetric concentrations between 400 to 2,500 parts per million (ppm) relative to the volume of the basic diesel fuel, regardless whether the chemical components are in the lower or upper percentage range by volume ratio.

2. A liquid petroleum derived unleaded gasoline fuel composition comprising a basic unleaded gasoline fuel for spark ignition engines and a catalytic clean combustion promoter composition comprising by volume:

| | |
|---|---|
| a ketone solvent selected from the group consisting of ethyl isomyl ketone and n-amyl ketone | from 1 to 55%, |
| a selected from the group consisting of diacetone alcohol and methyl amyl alcohol | from 1 to 60%, |
| a catalytic medium comprising 1-methyl-2-pyrrolidone | from 1 to 30%, |
| an aromatic amine selected from the group consisting of n-ethylaniline and diethylaniline | from 1 to 30%, |
| an ether selected from the group consisting of MTBE, ETBE, and TAME, and | from 1 to 85%, |
| a nitroparaffin compound selected from the group consisting of 1-nitropopane, 2-nitropropane, and nitroethane | from 1 to 35%. | said catalytic clean combustion promoter composition is present in micro volumetric concentrations between 400 to 2,500 parts per million (ppm) relative to the volume of the basic unleaded gasoline, regardless whether the chemical components are in the lower or upper percentage range by volume ratio.

* * * * *